United States Patent
Hawawini et al.

(10) Patent No.: US 8,896,272 B2
(45) Date of Patent: Nov. 25, 2014

(54) SYSTEMS AND METHODS OF BATTERY CHARGING WITH DYNAMIC FLOAT VOLTAGE

(75) Inventors: Shadi Hawawini, San Jose, CA (US); M. Abid Hussain, Los Altos, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 684 days.

(21) Appl. No.: 12/476,123

(22) Filed: Jun. 1, 2009

(65) Prior Publication Data

US 2009/0295338 A1   Dec. 3, 2009

Related U.S. Application Data

(60) Provisional application No. 61/057,735, filed on May 30, 2008.

(51) Int. Cl.
  *H02J 7/00*   (2006.01)
  *H01M 10/44*   (2006.01)

(52) U.S. Cl.
  CPC ............ *H02J 7/0073* (2013.01); *H01M 10/44* (2013.01)
  USPC .......................................... 320/160; 320/148

(58) Field of Classification Search
  USPC ................................................ 320/139, 160
  See application file for complete search history.

(56) References Cited

U.S. PATENT DOCUMENTS

| | | | | |
|---|---|---|---|---|
| 5,442,274 A | * | 8/1995 | Tamai | 320/146 |
| 6,150,823 A | * | 11/2000 | Takahashi et al. | 324/427 |
| 6,275,006 B1 | * | 8/2001 | Koike et al. | 320/125 |
| 2005/0099162 A1 | * | 5/2005 | Ding | 320/141 |
| 2006/0250113 A1 | * | 11/2006 | Tsai et al. | 320/166 |
| 2007/0188135 A1 | * | 8/2007 | Odaohhara | 320/114 |
| 2007/0188139 A1 | * | 8/2007 | Hussain et al. | 320/128 |
| 2007/0216356 A1 | * | 9/2007 | Kamatani | 320/128 |

* cited by examiner

*Primary Examiner* — Drew A Dunn
*Assistant Examiner* — Robert Grant
(74) *Attorney, Agent, or Firm* — Fountainhead Law Group P.C.

(57) ABSTRACT

Embodiments of the present invention include electronic circuits, systems, and methods for charging a battery. In one embodiment, the present invention includes a method, which may be implemented by an integrated circuit, comprising charging the battery using a constant current until the voltage on the battery increases to a first voltage level, and charging the battery using a constant voltage, wherein the constant voltage is set to a second voltage level. The constant current charging transitions to constant voltage charging when the voltage on the battery reaches the first voltage level, where the first voltage level is greater than the second voltage level.

19 Claims, 7 Drawing Sheets

SYSTEMS AND METHODS OF BATTERY CHARGING WITH DYNAMIC FLOAT VOLTAGE

CROSS REFERENCE TO RELATED APPLICATIONS

This application claims priority to U.S. Provisional Patent Application Ser. No. 61/057,735, filed May 30, 2008, the entire disclosure of which is incorporated herein by reference.

BACKGROUND

The present invention relates to battery charging, and in particular, to electronic circuits, systems, and methods of charging a battery with a dynamic float voltage.

Batteries have long been used as a source of power for mobile electronic devices. Batteries provide energy in the form of electric currents and voltages that allow circuits to operate. However, the amount of energy stored in a battery is limited, and batteries lose power when the electronic devices are in use. When a battery's energy supply becomes depleted, the battery's voltage will start to fall from its rated voltage, and the electronic device relying on the battery for power will no longer operate properly. Such thresholds will be different for different types of electronic devices.

Many types of batteries are designed for a single use. Such batteries are discarded after the charge is depleted. However, some batteries are designed to be rechargeable. Rechargeable batteries typically require some form of battery charging system. Typical battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can be very inefficient or altogether ineffective. Inefficient use of the battery's charging specification can lead to very long charging times, for example. Additionally, if the charging process is not carried out efficiently, the battery's cell capacity (i.e., the amount of energy the battery can hold) may not be optimized. Moreover, inefficient charging can impact the battery's useful lifetime (i.e., number of charge/discharge cycles available from a particular battery).

Thus, it would be desirable to improve battery charging techniques. The present invention solves these and other problems by providing circuits, systems, and methods of charging a battery.

SUMMARY

Embodiments of the present invention include electronic circuits, systems, and methods for charging a battery. In one embodiment, the present invention includes a method, which may be implemented by an integrated circuit, comprising charging the battery using a constant current until the voltage on the battery increases to a first voltage level, and charging the battery using a constant voltage, wherein the constant voltage is set to a second voltage level. The constant current charging transitions to constant voltage charging when the voltage on the battery reaches the first voltage level, where the first voltage level is greater than the second voltage level. Additional embodiments will be evident from the following detailed description and accompanying drawings, which provide a better understanding of the nature and advantages of the present invention.

DETAILED DESCRIPTION

Described herein are improved techniques for battery charging. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
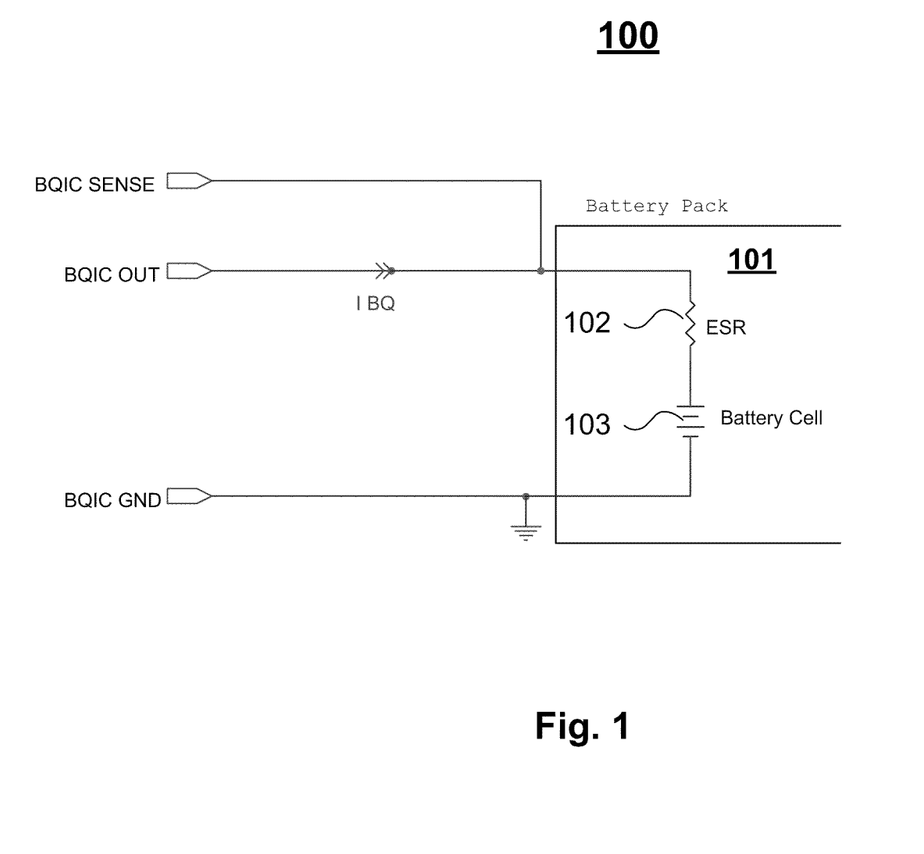
FIG. 1 illustrates a battery pack including a battery cell and series resistance.

Embodiments of the present invention include systems and methods for decreasing the effective charge time of a battery. Example applications may be in charging Li-ion or Li-Polymer batteries. This method may use the minimum equivalent series resistance (ESR) of the battery pack, the minimum battery charge current of a battery charger integrated circuit (BQIC), or the ability to adjust the voltage applied to the battery to reduce the charge time. A method for a circuit to calculate the ESR of the battery dynamically is also disclosed. FIG. 1 illustrates a battery charging system 100 including a battery pack 101, ESR 102, and battery cell 103. The term "float voltage" is commonly used to refer to a constant voltage applied to the battery pack input (e.g., at BQIC OUT) to charge the battery during a constant voltage charging cycle. The float voltage is sometimes also used as a reference voltage to control the transition between constant current charging and constant voltage charging. Accordingly, the term "float voltage" may also refer to the voltage at which the system transitions from constant current charging to constant voltage charging (i.e., the transition voltage). In some applications, the float voltage is about the voltage at which the cell of the battery pack is considered fully charged, and is typically 4.2V for a Li-ion or Li-Polymer battery. Battery pack voltage is a term sometimes used to refer to the voltage across the terminals of the battery during charging (e.g., while current is flowing into the battery). Finally, the cell voltage is the voltage of the battery cell after the ESR voltage drop in the pack, or simply the voltage across the terminals of the battery pack when no current is flowing through the ESR (e.g., open-circuited), for example.

Figure 2:
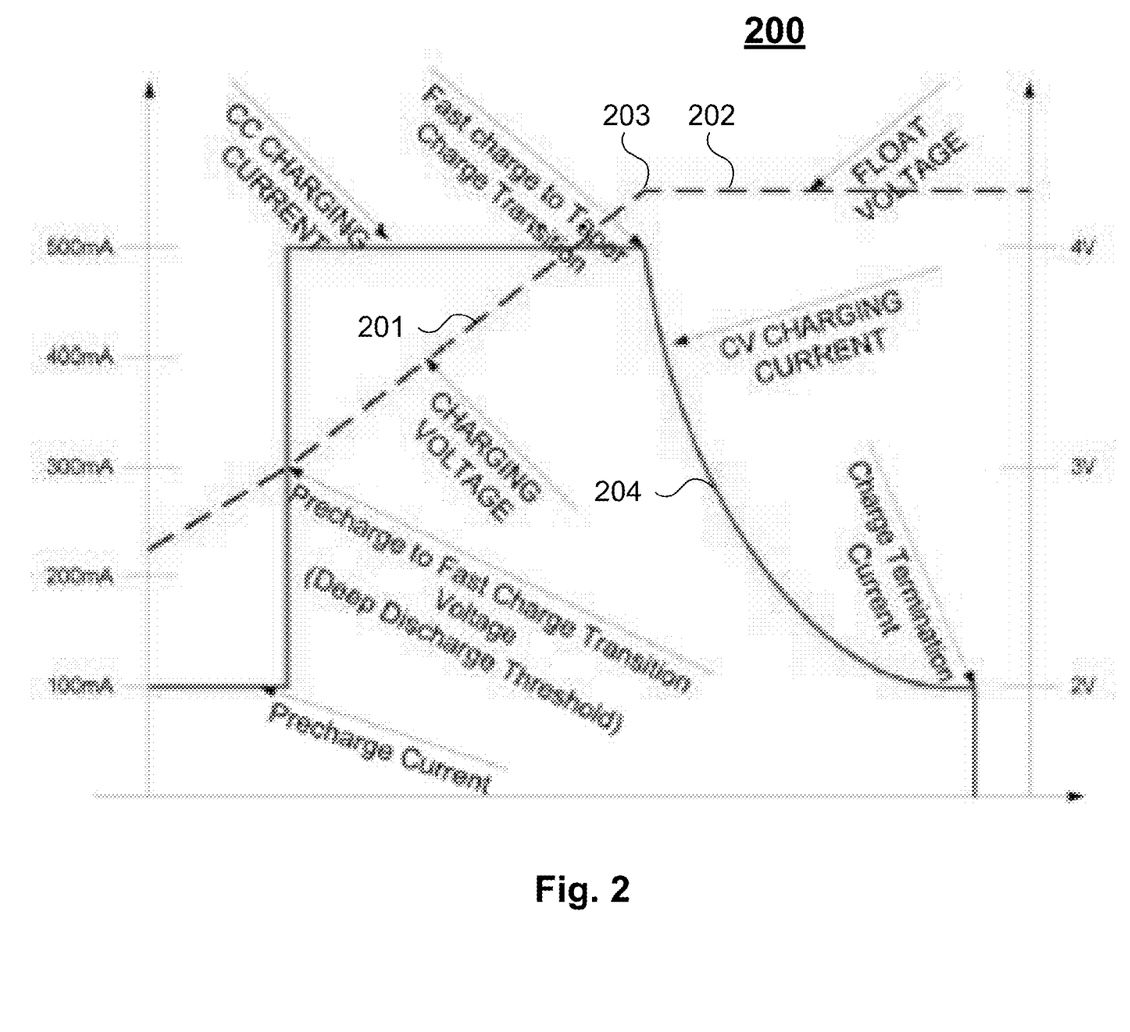
FIG. 2 illustrates one battery charge scheme.

Generally, Li-ion and Li-Polymer batteries may use the constant current-constant voltage (CC-CV) charging algorithm. FIG. 2 illustrates a traditional charge cycle of a battery including both constant current (CC) modes and constant voltage (CV) modes. During a CC-CV cycle, the battery charge circuit generates a current that is held constant until a particular voltage is reached (e.g., the float voltage), at which point the charge circuit transitions into constant voltage mode (CV) and generates a constant voltage, where the battery charge current tapers down (taper charge) to ideally 0 mA. In FIG. 2, a constant current of 500 mA is generated during CC mode, and the battery pack voltage increases at 201 during this portion of the cycle. The battery pack voltage increases up to the float voltage at 203, and the charge circuit transitions to CV mode and maintains a constant voltage 202. The charge current tapers off at 204 during CV mode. At zero current, the battery pack voltage is equal to the battery cell voltage. This is ideally the case when the cell is fully charged. CV charging is used because a voltage greater than 4.2V on the cell can be potentially dangerous, however the compromise for this safety is that while in CV mode, the charge current (or taper charge) is exponentially reduced from the charge current while in CC, which increases the time to fully charge the battery. At the end of CC mode, the battery pack voltage is at the transition voltage (e.g., 4.2V) while the cell voltage is given by the equation 1.

$$V_{Cell} = V_{Pack} - I_{BQ,CC} R_{ESR} \quad \text{(Equation 1)}$$

At the end of constant current mode, when the voltage on the battery pack increases to the transition voltage, the voltage on the battery cell will be less than the fully rated voltage due to the voltage drop across the ESR due to the constant current. For instance, for an ESR of 1 ohm and Battery Charge Current of 500 mA during CC mode, the cell voltage is 500 mV less than the pack voltage, meaning that CC charging can be extended by raising the float voltage (e.g., to 4.7V). Accordingly, embodiments of the present invention may increase the voltage at which the charge circuit transitions from constant current to constant voltage above the voltage at which the battery is traditionally considered fully charged. When the voltage on the battery pack reaches this new higher voltage, the system transitions from constant current mode to constant voltage mode. In constant voltage mode, a voltage at which the battery is considered fully charged is used. Accordingly, one embodiment of the present invention may use a first voltage for triggering the transition from constant current charging to constant voltage charging and a second voltage for constant voltage charging, where the first voltage is higher than the second voltage and where the second voltage is approximately the voltage at which the battery is considered fully charged. The first voltage may be higher than the second voltage by an amount approximately equal to the voltage drop across a series resistance between an input of the battery and the battery cell so that the voltage across the battery cell does not damage the cell. By remaining in CC mode for a longer period of time, where the charge entering the cell is higher, more charge is allowed to go into the battery per unit time, thereby reducing the effective charge time.

One embodiment of a charging algorithm may be based on characterization as shown below:

1) Characterization of the Battery Pack ESR (e.g., a minimum ESR, $R_{ESR}$).
2) Characterization of the CC battery charge current (e.g., a minimum specified current, $I_{BQ,CC}$).
3) Calculation of a new transition voltage based on a maximum cell voltage is shown in Equation 2 below:

$$V_{Float,new} = V_{CELLMAX} + I_{BQ,CC(min)} R_{ESR(min)}, \quad \text{(Equation 2)}$$

where Vfloat,new is the transition voltage that triggers activation of the constant voltage charging and deactivation of constant current charging. Vcellmax is the maximum battery cell voltage, and may be set at an example float voltage of 4.2 v used for constant voltage charging, for example. For instance, if the charge circuit is characterized as having a charge current of 500 mA±5 mA, then a value of 495 mA may be used. Similarly, if the battery is characterized as having a series resistance of 1 ohm±0.1 ohms, then a value of 0.9 ohms may be used. The transition voltage may then be set at a predetermined value of V=4.2+0.4455=4.66 volts, for example.

Figure 3A:
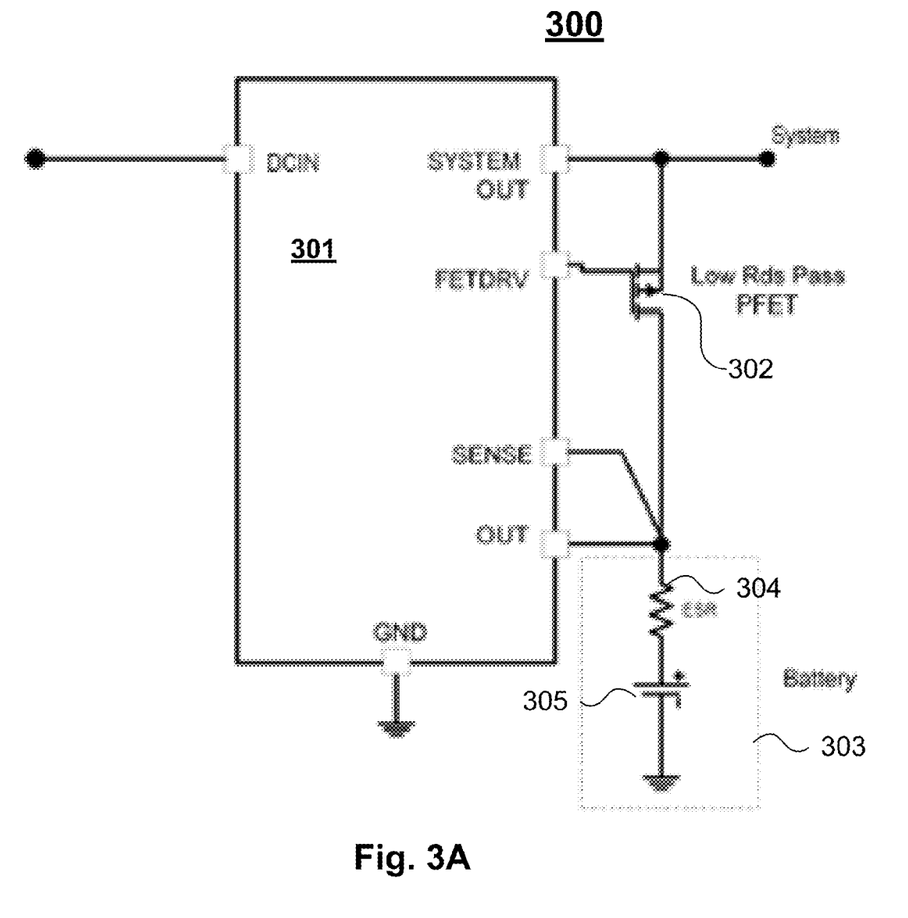
FIG. 3A illustrates an integrated circuit battery charger.

Another embodiment of the charging algorithm includes determining the battery resistance dynamically. For example, in one embodiment, the ESR, charge current, and new transition voltage can be determine by a charge circuit by separating the battery from the system load. Such a system is shown in FIG. 3. The charge circuit 301 may receive DC power on an input terminal DCIN and provide regulated system power on an output terminal SYSTEM OUT. Circuit 301 may include an output FETDRV for driving an external transistor, such as a low resistance FET 302, for example. In other embodiments, the low resistance FET 302 may be included in circuit 301. The battery pack 303 may be coupled to or decoupled from the system by turning the FET on and off. With the system load removed by turning off the pass PFET, the battery is virtually open circuited. Circuit 301 may include another output terminal OUT for charging the battery. The output terminal OUT may be coupled to the battery cell 305 through a series resistance (ESR) 304 as described above. Circuit 301 may include a SENSE input terminal that is also coupled to the battery pack input for sensing the voltage at the battery pack input and therefore the voltage across the series resistance and battery cell. The SENSE terminal may, for example, be coupled to an analog to digital converter ("ADC") or other processing circuitry for performing the functions described below. In one example embodiment, an ADC on SENSE may take the initial cell voltage measurement when no current is flowing into the battery pack and store this voltage as $V_{cell}$. In one embodiment, a pulse charge current, $I_{pulse}$ from OUT, is then sent to the battery and another voltage measurement $V_{ESR}$ is taken, which is the voltage across the battery pack while a constant current is flowing into the battery pack (i.e., through the series resistance and into the cell). Using this information, the new transition voltage, denoted here as Vfloat, high, may be determined using equation 3.

$$V\text{float, high} = V\text{float, low} + (V_{ESR} - V\text{cell}) \quad \text{(Equation 3)}$$

Where Vfloat, high is the voltage at which the charge circuit transitions from constant current to constant voltage charging, and Vfloat, low is the voltage used during the constant voltage mode charging (e.g., the voltage at which the battery is considered fully charged or the maximum tolerance voltage for the battery cell such as 4.2V). The magnitude of Ipulse may be equal to the value of the current used at the very end of constant current charging mode just prior to transitioning to constant voltage charging mode, for example. Additionally, Ipulse may be long enough to be considered DC and account for any series inductance, but short enough to ensure minimal additional charging has occurred on the battery cell. For example, Ipulse may be short enough in time so that an insufficient amount of Lithium has been extracted from the cathode and inserted into the anode. In one embodiment, charging the battery and powering the system may occur simultaneously. For example, when the pass PFET is turned off, the system may still be powered from DCIN, and the charge circuit may perform a charge cycle including the fast-mode of charging.

Figure 3B:
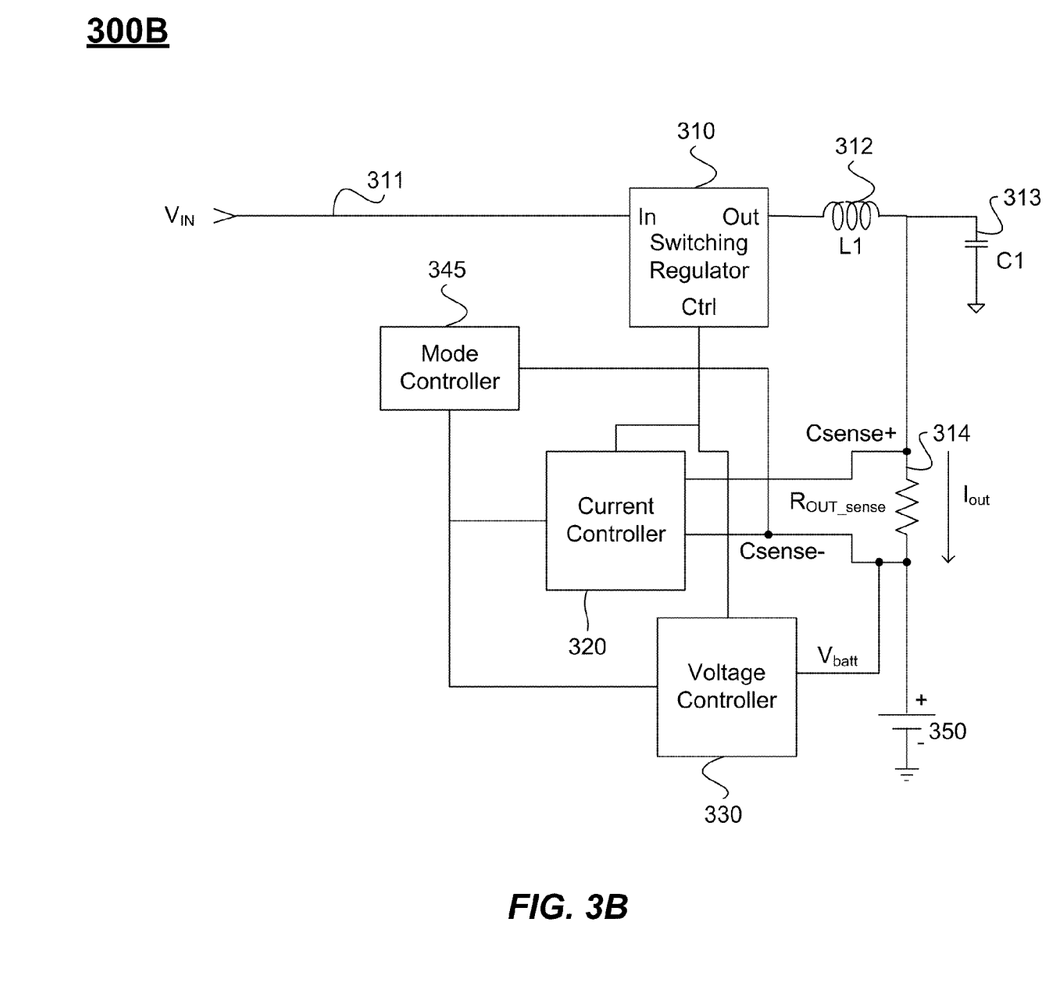
FIG. 3B illustrates a circuit for charging a battery.

FIG. 3B illustrates a circuit for charging a battery according to one embodiment of the present invention. Circuit 300B illustrates one example implementation of the present invention. In this example, circuit 300 includes a switching regulator 310, current controller 320, and voltage controller 330, which may be included on a single integrated circuit. An input voltage, Vin, is received by switching regulator 310 on input terminal 311. An output of the switching regulator 310 is coupled to a filter including an inductor 312 and a capacitor 313. In this example, the output of the filter is coupled through a sense resistor 314 to battery pack 350. The battery 350 may include a battery cell and ESR (not shown) as described above. The output of the switching regulator 310 is alternatively controlled by the current controller 320 or voltage controller 330. Initially, the system may be in a current control mode, where current controller 320 and switching regulator 310 generate a constant current into the battery. Here, current controller 320 includes input terminals coupled across the sense resistor 314 to sense the output current, Iout. Current controller 320 provides a control signal to switching regulator 310 (e.g., at the Ctrl input of the regulator) to maintain the output current constant. As mentioned below, some embodiments may vary the constant current level over time, but current controller 320 still operates in a controlled current mode where current is the control parameter. Current controller 320 and switching regulator 310 are one example means for charging a battery using a controlled current. When the voltage on the battery 350 increases above a transition voltage, as described above, controlled current charging transitions to constant voltage charging. Accordingly, the controlled current control circuit 320 is inactivated and the constant voltage control circuit 330 is activated. A variety of analog or digital techniques may be used to sense the transition voltage, including the use of analog comparators or analog-to-digital converter circuits, for example. In this example, a mode controller circuit 345 has an input coupled to a terminal of the battery 350 to detect the battery voltage. Mode controller 345 may have outputs coupled to the controlled current control circuit 320 or constant voltage control circuit 330, or both, for controlling the transition and/or setting the controlled current or constant voltage values used during charging. After the transition, the system may be in a voltage control mode, where voltage controller 330 and switching regulator 310 generate a constant voltage to the battery. As described above, the constant voltage applied to the battery 350 may be less than the transition voltage. Here, voltage controller 320 includes an input terminal coupled to a terminal of the battery 350 to sense the battery voltage, Vbatt. Voltage controller 330 provides a control signal to switching regulator 310 (e.g., at the Ctrl input of the regulator) to maintain the output voltage on the battery constant. Voltage controller 330 and switching regulator 310 are one example means for charging a battery using a constant voltage.

Figure 4:
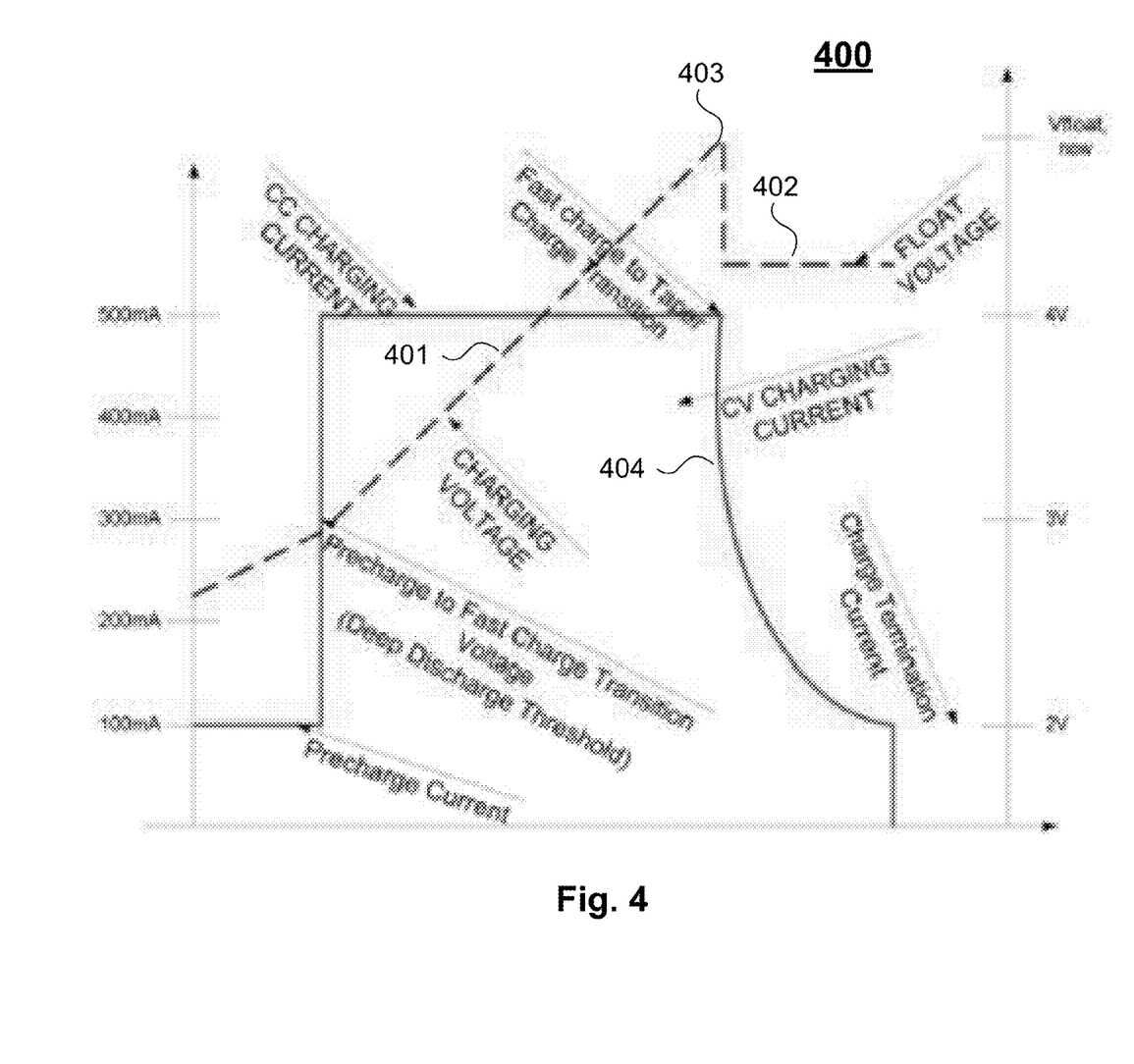
FIG. 4 illustrates another battery charge scheme.

FIG. 4 illustrates a method of charging a battery according to one embodiment of the present invention. Using the transition voltage from equation 2 or equation 3, an example charging algorithm can be implemented as follows:
1) CC charging until the transition voltage is reached;
2) Stop battery charging for a sufficient time for the battery pack voltage to drop below the voltage used for constant voltage charging (e.g., the rated cell voltage);
3) Resume charging with a CV float voltage (e.g., 4.2V);
4) Allow the charger circuit to taper charge and terminate as normal.

Results

Figure 5:
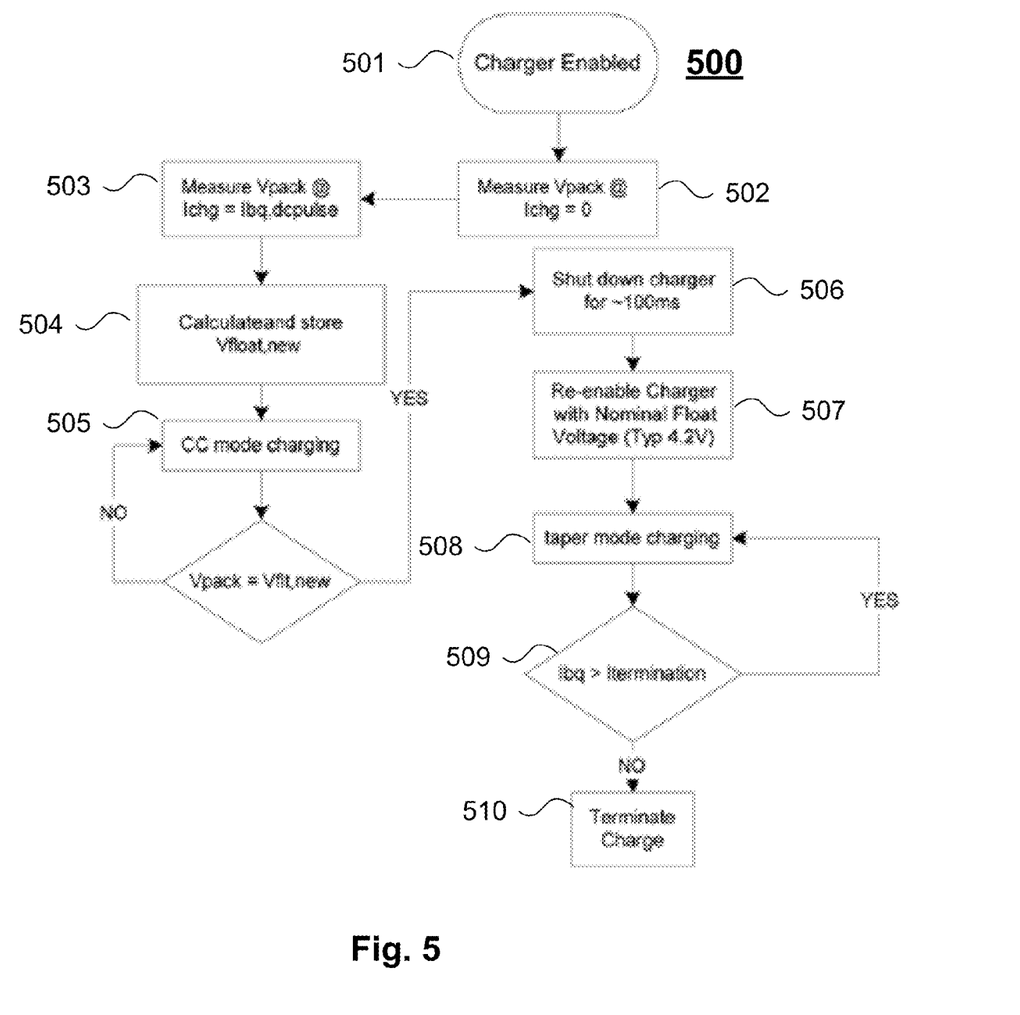
FIG. 5 illustrates an example process for charging a battery.
Figure 6A:
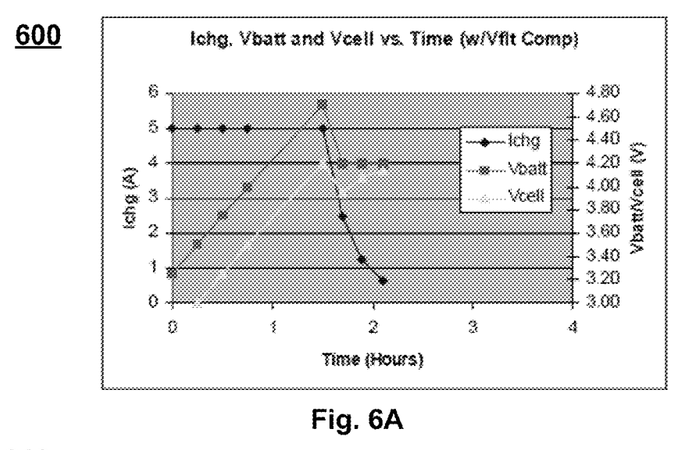
FIGS. 6A-B illustrate charge characteristics using different charge techniques.
Figure 6B:
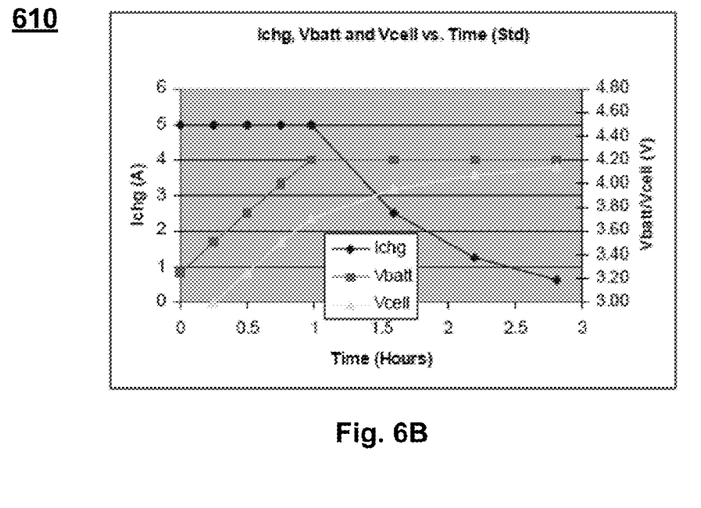

Using the techniques described above, embodiments of the invention may reduce overall charge time significantly (e.g., possibly approaching as much as 30% or possibly more) when compared to traditional CC-CV charging methods. FIG. 5 illustrates an example flow chart for a charge circuit according to another embodiment of the invention. At 501 a charger circuit may be enabled. At 502, the battery pack voltage may be measured. For example, the battery pack may be configured so that no current is flowing in the battery (Ichg=0). At 503, a current is generated into the battery and the battery pack voltage is measured again. In one example embodiment, a current pulse is generated to produce and measure the battery pack voltage. Alternatively, the battery pack voltage with current turned on may be measured before the measurement taken with the current turned off. However, in this example, the process is conducted such that the battery cell voltage (i.e., the charge on the battery) does not change between the measurements. Additionally, the measurement may be conducted during a constant current charge cycle so that the current used to make the measurement is the same as the constant charge current used to charge the battery. For example, if the battery voltage is too low, such as during a "pre-charge" cycle, then performing the measurements using a large current pulse may damage the battery. In one embodiment, a constant current charge cycle may charge the battery pack voltage to a first voltage level, and when the first voltage level is reached, constant current charging is suspended while the battery pack voltage is measured at zero current. Constant current charging may then be continued until the battery pack reaches a second higher voltage level. At 504, the CC-CV transition voltage is calculated (i.e., Vfloat.new). In a mixed signal implementation, this value may be stored in a digital register or memory, for example. At 505, constant current charging occurs. Constant current charging may continue until the battery pack voltage is equal to the transition voltage (i.e., Vpack=Vfloat.new). At 506, constant current charging is shut down, and charging may be suspended for a period of time (e.g., the battery may have zero current for about 100 ms). At 507, constant voltage charging occurs using another voltage, which may be the desired charge voltage for the battery. At 508, the current tapers off as the battery continues to charge. This process continues at 509 as long as the charge current is above a termination value (Ibq>I termination). When the taper charge current falls below the termination value, charging is terminated at 510. FIG. 6A-B show a comparison of charging a battery using the techniques described herein versus traditional techniques. FIG. 6A shows the voltage on the battery increasing to a first voltage during constant current charging and then falling to a second final voltage for constant voltage charging. FIG. 6B shows the traditional approach where the voltage on the battery increases to a final voltage value.

Embodiments of the present invention may be implemented in a system that uses a programmable float voltage, for example, and the float voltage can either be manipulated by a microcontroller or can be autonomously controlled by the charger circuits. For example, some embodiments may use programmable charge circuits or methods disclosed in commonly owned U.S. Pat. No. 7,528,574, filed Feb. 16, 2006, naming Kenneth C. Adkins and M. Abid Hussain as inventors, which is hereby incorporated herein by reference, and commonly owned U.S. patent application Ser. No. 11/356,561, filed Feb. 16, 2006, naming Kenneth C. Adkins, M. Abid Hussain, and Georgios Constantinos Paparrizos as inventors, which is also hereby incorporated herein by reference. It is to be understood that embodiments of the present invention may use a constant current scheme where the current is reduced as the voltage on the battery increases as set forth in U.S. patent application Ser. No. 11/356,561. In this case, the difference between the voltage used to trigger the transition from CC mode to CV mode and the float voltage used for CV mode may be equal to the constant current level just prior to the transition (i.e., the current value when the voltage across the battery pack reaches the transition voltage value) multiplied by the series resistance in the battery pack.

Accordingly, it should be noted that constant current charging includes implementations where the constant current level changes over time, but where the current is used as a control parameter to control a regulator, such as a switching regulator, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, switching systems and methods with current sensing according to the present invention may include some or all of the innovative features described above. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
generating a current from a regulator, in a current control mode, to a terminal of a battery pack over a first time period, wherein the battery pack comprises a battery cell and an equivalent series resistance in series inside the battery pack;
transitioning the regulator from the current control mode to a constant voltage mode when a voltage on the terminal of the battery pack increases to a first voltage level; and
generating a constant voltage to the battery pack in the constant voltage mode over a second time period following the first time period, wherein the constant voltage is set to a second voltage level at which the battery pack is considered fully charged,
wherein a difference between the first voltage level and the second voltage level corresponds to a voltage produced by said equivalent series resistance and said current at the end of said current control mode just prior to said transitioning so that the voltage on the battery cell, during current control mode, is less than a maximum battery cell voltage, and wherein the voltage on the battery cell, just prior to said transitioning, is approximately equal to the second voltage level, and wherein the first voltage level is determined dynamically based on the equivalent series resistance of the battery pack.

2. The method of claim 1 wherein the difference between the first voltage level and the second voltage level corresponds to a voltage produced by a minimum equivalent series resistance and a minimum current at the end of said current control mode just prior to said transitioning.

3. The method of claim 1 wherein determined dynamically comprises:
suspending said generating the current, before said transitioning, when a voltage on the battery pack reaches said second voltage level;
measuring a first battery voltage when a current into the battery pack is approximately zero, the first battery voltage corresponding to a battery cell voltage;
generating a current pulse and measuring a second battery voltage; and
setting the first voltage level to a sum of the second voltage level and a value, wherein the value is a difference between the second battery voltage and the first battery voltage.

4. The method of claim 1 wherein the regulator is a switching regulator.

5. An apparatus comprising:
a regulator;
a current controller;
a voltage controller; and
a battery pack comprising a battery cell and an equivalent series resistance in series inside the battery pack,
wherein the regulator generates a current, in a current control mode, to a terminal of a battery pack over a first time period,
wherein the regulator transitions from the current control mode to a constant voltage mode when a voltage on the terminal of the battery pack increases to a first voltage level,
wherein the regulator generates a constant voltage to the battery pack in the constant voltage mode over a second time period following the first time period,
wherein the constant voltage is set to a second voltage level at which the battery pack is considered fully charged, and
wherein a difference between the first voltage level and the second voltage level corresponds to a voltage produced by said equivalent series resistance and said current at the end of said current control mode just prior to said transitioning so that the voltage on the battery cell, during current control mode, is less than a maximum battery cell voltage, and wherein the voltage on the battery cell, just prior to said transitioning, is approximately equal to the second voltage level, and wherein the first voltage level is determined dynamically based on the equivalent series resistance of the battery pack.

6. The apparatus of claim 5 wherein the difference between the first voltage level and the second voltage level corresponds to a voltage produced by a minimum equivalent series resistance and a minimum current at the end of said current control mode just prior to said transitioning.

7. The apparatus of claim 5 wherein the regulator suspends said generating the current, before said transitioning, when a voltage on the battery pack reaches said second voltage level, wherein a first battery voltage is measured when a current into the battery pack is approximately zero, the first battery voltage corresponding to a battery cell voltage, wherein a current is generated and a second battery voltage is measured, and wherein the first voltage level is set to a sum of the second voltage level and a value, wherein the value is a difference between the second battery voltage and the first battery voltage.

8. The apparatus of claim 5 wherein the regulator is a switching regulator.

9. An integrated circuit comprising:
a regulator having an output coupled to a battery pack, the battery pack comprising a battery cell and an equivalent series resistance in series inside the battery pack;
a current controller; and
a voltage controller;
wherein the regulator generates a current, in a current control mode, to a terminal of a battery pack over a first time period,
wherein the regulator transitions from the current control mode to a constant voltage mode when a voltage on the terminal of the battery pack increases to a first voltage level,
wherein the regulator generates a constant voltage to the battery pack in the constant voltage mode over a second time period following the first time period,
wherein the constant voltage is set to a second voltage level at which the battery pack is considered fully charged, and wherein a difference between the first voltage level and the second voltage level corresponds to a voltage produced by said equivalent series resistance and said current at the end of said current control mode just prior to said transitioning so that the voltage on the battery cell, during current control mode, is less than a maximum battery cell voltage, and wherein the voltage on the battery cell, just prior to said transitioning, is approximately equal to the second voltage level, and wherein the first voltage level is determined dynamically based on the equivalent series resistance of the battery pack.

10. The integrated circuit of claim 9 wherein the difference between the first voltage level and the second voltage level corresponds to a voltage produced by a minimum equivalent series resistance and a minimum current at the end of said current control mode just prior to said transitioning.

11. The integrated circuit of claim 9 wherein the regulator suspends said generating the current, before said transitioning, when a voltage on the battery pack reaches said second voltage level, wherein a first battery voltage is measured when a current into the battery pack is approximately zero, the first battery voltage corresponding to a battery cell voltage, wherein a current is generated and a second battery voltage is measured, and wherein the first voltage level is set to a sum of the second voltage level and a value, wherein the value is a difference between the second battery voltage and the first battery voltage.

12. The integrated circuit of claim 9 wherein the regulator is a switching regulator.

13. An apparatus comprising:
  means for generating a current, in a current control mode, to a terminal of a battery pack over a first time period and for generating a constant voltage to the battery pack, in a constant voltage mode, over a second time period following the first time period, wherein the battery pack comprises a battery cell and an equivalent series resistance in series inside the battery pack; and
  means for transitioning from the current control mode to a constant voltage mode when a voltage on the terminal of the battery pack increases to a first voltage level, wherein the constant voltage in constant voltage mode is set to a second voltage level at which the battery pack is considered fully charged;
  wherein a difference between the first voltage level and the second voltage level corresponds to a voltage produced by said equivalent series resistance and said current at the end of said current control mode just prior to said transitioning so that the voltage on the battery cell, during current control mode, is less than a maximum battery cell voltage, and wherein the voltage on the battery cell, just prior to said transitioning, is approximately equal to the second voltage level, and wherein the first voltage level is determined dynamically based on the equivalent series resistance of the battery pack.

14. The apparatus of claim 13 wherein the difference between the first voltage level and the second voltage level corresponds to a voltage produced by a minimum equivalent series resistance and a minimum current at the end of said current control mode just prior to said transitioning.

15. The apparatus of claim 13 wherein the means for generating the current suspends said generating the current, before said transitioning, when a voltage on the battery pack reaches said second voltage level, wherein a first battery voltage is measured when a current into the battery pack is approximately zero, the first battery voltage corresponding to a battery cell voltage, wherein a current is generated and a second battery voltage is measured, and wherein the first voltage level is set to a sum of the second voltage level and a value, wherein the value is a difference between the second battery voltage and the first battery voltage.

16. The apparatus of claim 13 wherein the means for generating a current comprises a current controller.

17. The apparatus of claim 16 wherein the regulator is a switching regulator.

18. The apparatus of claim 13 wherein the means for transitioning comprises a mode controller.

19. The apparatus of claim 13 wherein the means for generating a constant voltage comprises a voltage controller.

* * * * *